Jan. 13, 1931. L. R. BUCKENDALE 1,788,978
DRIVING MECHANISM
Filed June 29, 1929 2 Sheets-Sheet 2

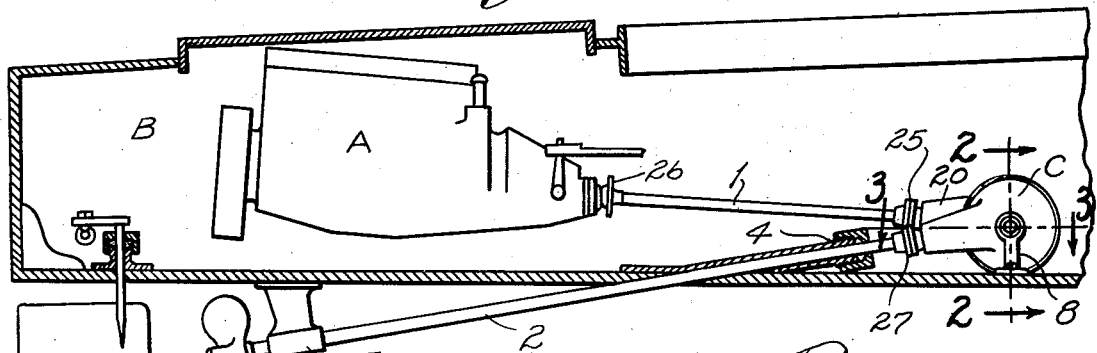
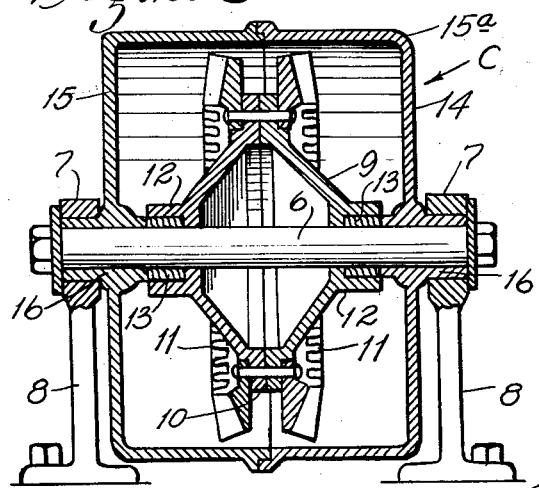
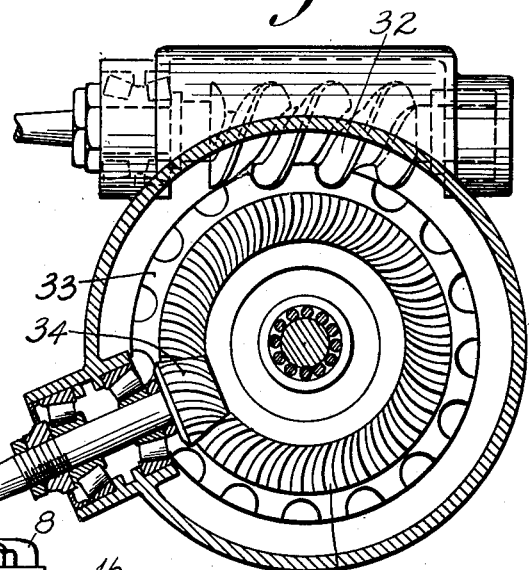
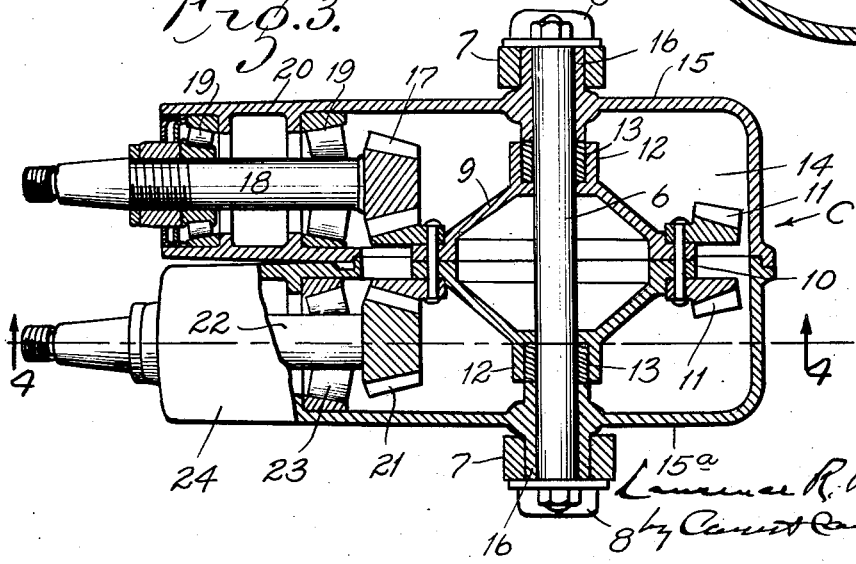

INVENTOR
L. R. Buckendale
HIS ATTORNEYS

Patented Jan. 13, 1931

1,788,978

UNITED STATES PATENT OFFICE

LAURENCE R. BUCKENDALE, OF DETROIT, MICHIGAN

DRIVING MECHANISM

Application filed June 29, 1929. Serial No. 374,798.

This invention relates to driving mechanisms, particularly to motor boat driving mechanisms of the kind wherein the power of a motor located in the stern of the boat is transmitted through a forwardly extending driving shaft to a gear reduction unit and thence to a rearwardly and downwardly inclined driven or propeller shaft that extends through the bottom of the boat and has a propeller on the end thereof. With such driving mechanisms, the angularity between the drive and driven shafts necessitates the use of gear reduction units that do not permit such angularity to be varied; or it necessitates the employment of gear reduction units whose gear shafts are disposed at an angle to and have universal joint connections with the non-parallel drive and driven shafts, thereby imposing excessive wear and stress on the universal joints and a variation of the angular velocity of the driven shaft. The principal object of the present invention is to devise a gear reduction unit having shafts that are adjustable relative to each other to any desired angle to bring them in axial alinement with the angularly disposed drive and driven shafts of the above type of driving mechanism. Other objects are simplicity and cheapness of construction and compactness of design. The invention consists in the construction, combinations and arrangements of parts hereinafter described and claimed.

Figure 4:
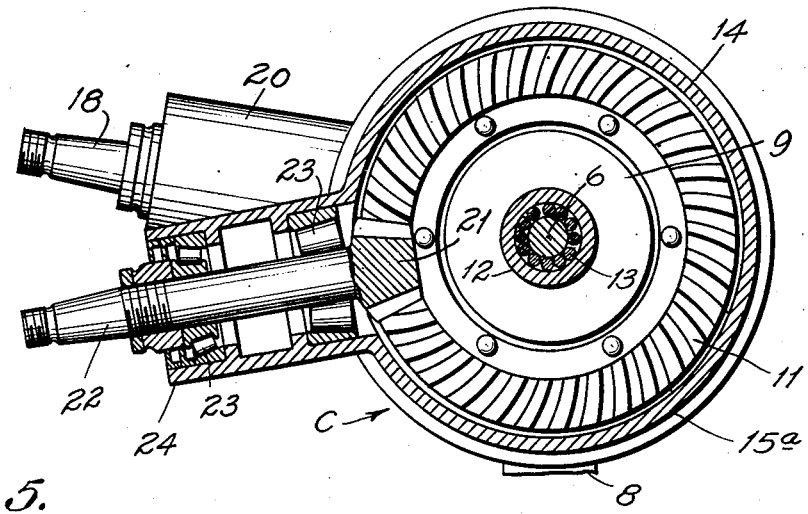
Figure 5:
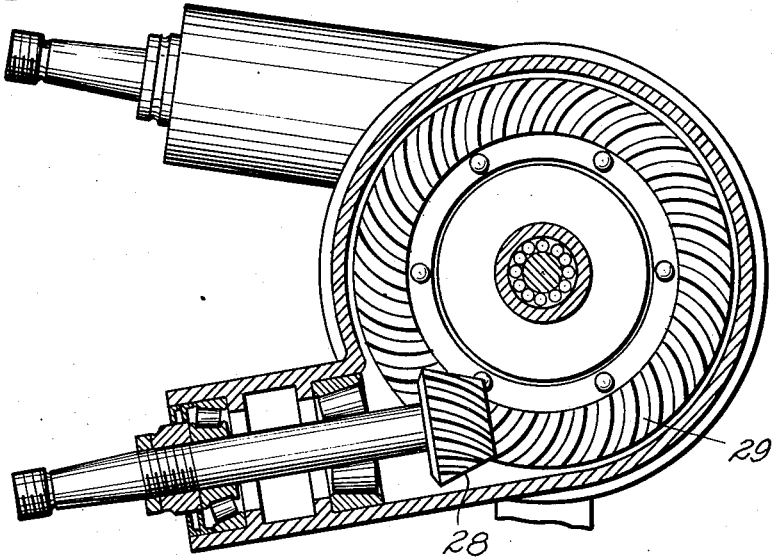
Figure 6:
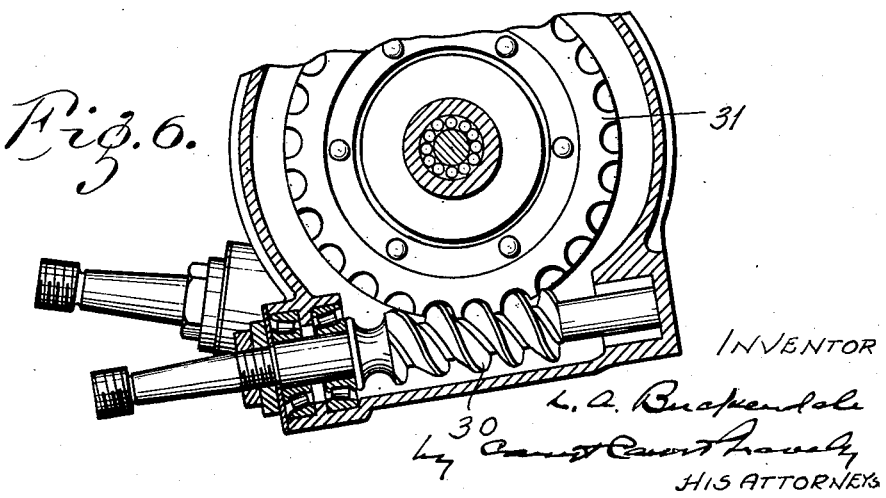

In the accompanying drawings, which form part of this specification and wherein like symbols refer to like parts wherever they occur, Fig. 1 is a vertical longitudinal section through the stern portion of a motor boat provided with a driving mechanism embodying my invention, Fig. 2 is an enlarged vertical cross-section through the gear reduction unit on the line 2—2 in Fig. 1, Fig. 3 is a section on the line 3—3 in Fig. 1, Fig. 4 is a section on the line 4—4 in Fig. 3, Fig. 5 is a side view of a gear reduction unit provided with hypoid gears, whereby the pinion shafts are offset with relation to the axes of the gears with which they intermesh; and Fig. 6 is a view similar to Fig. 5 showing the gear reduction unit equipped with worm gearing.

Fig. 7 shows a modification of the device in which a worm gear is combined with a bevel gear.

Referring to Fig. 1 of the accompanying drawings, my invention is shown in connection with a driving mechanism of the kind used for propelling motor boats. In such driving mechanism the power of a motor A located in the stern portion of the boat B is transmitted from said motor through a forwardly extending drive shaft 1 to a gear reduction unit C and thence to a downwardly and rearwardly inclined driven or propeller shaft 2 that extends through the bottom of the boat and has a propeller 3 mounted on its lower or rear end. As shown in the drawings, the propeller end of the driven shaft 2 extends through a suitable stuffing box 4; and the lower end of said shaft is journaled in a bearing 5 secured to the underside of said boat.

The gear reduction unit C comprises a shaft 6 disposed at right angles to the drive and driven shafts 1 and 2, respectively, with its end supported in the spaced standards 7 of a bracket 8 mounted in the boat opposite the forward ends of said drive and driven shafts. Journaled on the shaft 6 between the standards 7 of the bracket 8 is a double bevel gear 9 comprising a hollow body portion provided intermediate its ends with a circumferential rib 10 that has two concentric bevel gear rings 11 rigidly secured to the opposite sides thereof. The hollow body portion of the double bevel gear 9 is provided at its opposite ends with cylindrical hub portions 12 that are rotatably supported on the shaft 6 with suitable roller bearings 13 interposed between said hubs and shaft.

The bevel gear 9 is enclosed within a two-part oil containing casing or housing 14 that is also rotatably supported on the double gear supporting shaft 6. Said gear casing or housing comprises duplicate cylindrical casings or sections 15 and 15a having closed outer ends provided with hubs 16 rotatably supported on the cross shaft 6. The inner ends of the cylindrical sections are left open and are disposed with the adjacent edges of their cylindrical walls in overlapped relation.

One of the two bevel gears 11 of the double gear 9 meshes with a bevel pinion 17 on the inner end of a stub or pinion shaft 18, which is mounted in suitable roller bearings 19 in a radially extending tubular nosing 20 formed integral with the half section 15 of the gear casing 14. The other bevel gear of the double gear meshes with the bevel pinion 21 on the inner end of the stub or pinion shaft 22, which is mounted in suitable roller bearings 23 in a radially extending tubular nosing 24 formed integral with the other half section 15a of said gear housing 14.

The outer end of the pinion shaft 18 that is rotatably supported in the nosing 20 of the half section 15 of the gear casing 14 has a suitable universal joint connection 25 with the forward end of the drive shaft 1, whose rear end has a suitable universal joint connection 26 with the motor shaft. The outer end of the pinion shaft 22 that is journaled in the nosing 24 of the half section 15a of the casing 14 has a universal joint connection 27 with the forward end of the propeller or drive shaft 2.

By the arrangement described, the two half sections 15 and 15a of the gear casing 14 for the bevel gear 9 of the gear reduction unit C are adapted for free swinging movement relative to each other about the axis of said double gear to bring the pinion shafts carried by said sections into axial alinement with the angularly disposed drive and driven shafts 1 and 2, respectively, thereby eliminating excessive wear and stress on the universal joints and securing a uniform angular velocity of said pinion shafts and the shafts cooperating therewith. It is noted that by reason of the adjustable mounting of the two pinion shafts, said shafts may be brought into line with drive and driven shafts of any angularity. It is also noted that any desired gear ratio may be obtained for reducing or increasing the speed of the propeller shaft from the speed of the drive shaft by use of gear sets of different ratios.

It is also noted as an important advantage of the invention that it does not require a special type of gearing, but can be used with existing types of gearing of standard ratio ranges that are produced by the present manufacturing processes and tools.

In the modification shown in Fig. 5, the gear reduction unit is provided with gear sets comprising hypoid spiral pinions and gears 28 and 29, respectively, thereby offsetting the axes of the pinion shafts with respect to the axis of the gears cooperating therewith.

In the modification shown in Fig. 6, the relatively rotatable sections of the gear casing are each provided with a worm 30 working on a worm gear 31 mounted on the shaft about which said sections oscillate.

In the modified construction shown in Fig. 7, one of the rotatable sections of the gear reduction unit is provided with a worm 32 meshing with a worm gear 33, and the other of said sections is provided with a bevel pinion 34 meshing with a bevel gear 35. This arrangement is particularly adapted for use with drives where gear reductions as great as six to one are required.

While I have shown and described the above driving mechanism in connection with a motor boat, it is obvious that said mechanism is equally applicable to automobiles. Obviously, the construction hereinbefore described admits of considerable variation without departing from my invention.

What I claim is:

1. A driving mechanism comprising angularly disposed drive and driven shafts, and a driving connection between the adjacent converging ends of said shafts, said connection comprising a double gear rotatable on a fixed axis disposed crosswise to said ends of said shafts, stub shafts coupled to the respective drive and driven shafts, pinions on said stub shafts meshing with the respective gears of said double gear, and means for supporting said stub shafts for relative rotary movement about the fixed axis about which said double gear rotates.

2. A driving mechanism comprising angularly disposed drive and driven shafts, and a driving connection between the adjacent converging ends of said shafts, said connection comprising worm gears rotatable on a fixed axis disposed crosswise to said ends of said shafts, stub shafts coupled to the respective drive and driven shafts, worms on said stub shafts meshing with the respective worm gears, and a two part casing enclosing said worm gears, each part supporting one of said stub shafts and being rotatable about the fixed axis of said worm gears independently of the other part.

3. A driving mechanism comprising angularly disposed drive and driven shafts, and a gear reduction unit between the adjacent converging ends of said shafts, said unit comprising a double bevel gear rotatable on a fixed axis disposed crosswise to said ends of said shafts, stub shafts coupled to the respective drive and driven shafts with their axes offset with respect to the axis of said double gear, pinions on said stub shafts and meshing with the respective gears of said double gear, and means for supporting said stub shafts for relative rotary movement about the fixed axis of said double gear to bring them into substantially axial alinement with the axes of the respective drive and driven shafts.

4. A driving mechanism comprising angularly disposed drive and driven shafts, and a driving connection between the converging ends of said shafts, said connection comprising a shaft disposed crosswise to said ends of said drive and driven shafts, stationary supports for the ends of said shaft, a double gear supported on said shaft, stub shafts coupled to the respective drive and driven shafts, pinions of said stub shafts meshing with the respective gears of said double gear, and members for supporting the respective stub shafts, said members being mounted for independent rotary movement on the gear supporting shaft between the stationary supports for the ends thereof.

5. A driving mechanism comprising angularly disposed drive and driven shafts, and a gear reduction unit between the converging ends of said shafts, said unit comprising a shaft disposed crosswise to said ends of said drive and driven shafts, stationary supports for the ends of said shaft, a double gear journaled on said shaft, stub shafts having universal joint connections with the respective drive and driven shafts, pinions on said stub shafts meshing with the respective gears of said double gear, and members for supporting the respective stub shafts, said members being mounted for independent rotary movement on the supporting shaft between the stationary supports therefor and cooperating with each other to form a casing for said double gear.

6. A driving mechanism comprising angularly disposed drive and driven shafts, and a driving connection between the adjacent converging ends of said shafts, said connection comprising a bevel gear and a worm gear arranged to rotate together about a fixed axis disposed crosswise to said ends of said shafts, stub shafts coupled to the respective drive and driven shafts, a bevel pinion on one of said stub shafts meshing with said bevel gear, a worm on the other stub shaft meshing with said worm gears, and means for supporting said stub shafts for relative rotary movement about the axes of said bevel and worm gears.

7. A driving mechanism comprising angularly disposed drive and driven shafts, and a driving connection between the adjacent converging ends of said shafts, said connection comprising a shaft disposed crosswise to said ends of said drive and driven shafts, stationary supporting brackets for said cross-shaft, two gears supported on said cross-shaft to rotate together about the axis thereof, stub shafts having universal joint connections with the respective drive and driven shafts, pinions of said stub shafts meshing with the respective gears, and a casing mounted on said shaft between the supporting brackets therefor and enclosing said gears, said casing comprising two cooperating sections supporting the respective stub shafts and arranged for independent rotary movement about the axes of the two gears on said cross-shaft.

8. A driving mechanism for a motor boat comprising a motor mounted in the stern of said boat, a drive shaft extending forwardly from said motor, a rearwardly extending propeller shaft disposed at an angle to said drive shaft, and a gear reduction unit between the adjacent forward ends of said shafts, said unit comprising two gears arranged to rotate together about a fixed axis disposed crosswise to said ends of said shafts, stub shafts coupled to said drive shaft and propeller shaft respectively, pinions on said stub shafts and meshing with the respective gears, and means for supporting said stub shafts for relative rotary movement about the axes of said gears.

9. A driving mechanism for a motor boat comprising a motor mounted in the stern of said boat, a drive shaft extending forwardly from said motor, a rearwardly extending propeller shaft disposed at an angle to said drive shaft, and a gear reduction unit between the adjacent forward ends of said shafts, said unit comprising two gears arranged to rotate together about a fixed axis disposed crosswise to said ends of said shafts, stub shafts coupled to drive shaft and propeller shaft respectively, pinions on said stub shafts and meshing with the respective gears, and a two part casing enclosing said gears, each part supporting one of said stub shafts and being rotatable about the axes of said gears independently of the other part.

10. A driving mechanism for a motor boat comprising a motor mounted in the stern of said boat, a drive shaft extending forwardly from said motor, a propeller shaft disposed below and at an angle to said drive shaft, a shaft disposed crosswise to the forward ends of said shafts, a bracket mounted in said boat for supporting said cross-shaft therein, a double gear mounted on said cross-shaft, stub shafts coupled to the repective drive and propeller shafts, pinions on said stub shafts meshing with the respective gears of said double gear, and means mounted on said cross-shaft for supporting said stub shafts for relative rotary movement about the axes of said cross-shaft.

11. A driving mechanism for a motor boat comprising a motor mounted in the stern of said boat, a drive shaft extending forwardly from said motor, a propeller shaft disposed below and at an angle to said drive shaft, a shaft disposed crosswise to the forward ends of said shafts, a bracket rigidly mounted in said boat and having spaced standards for supporting the ends of said cross-shaft, a double gear mounted on said cross-shaft, stub shafts coupled to the respective drive and propeller shafts, pinions on said stub shafts meshing with the respective gears of said double gear, and a two-part casing located between the supporting standards for said cross-shaft and enclosing said gear, each part supporting one of said stub shafts and being mounted on said cross-shaft for rotation independently of the other part about the axis of said cross-shaft.

12. A driving mechanism comprising transversely spaced angularly disposed drive and driven shafts, and a driving connection between the adjacent converging ends of said shafts, said connection comprising a worm on said drive shaft, a bevel gear on said driven shaft, a worm wheel and bevel gear arranged to rotate together on a fixed common axis disposed crosswise to said shafts and meshing respectively with the worm on said drive shaft and the bevel gear on said driven shaft, and means for supporting said shafts for relative rotary movement about the fixed common axis of said worm wheel and said first mentioned bevel gear.

13. A driving mechanism comprising transversely spaced drive and driven shafts, and a driving connection between said shafts at one end thereof, said connection comprising a double hypoid gear mounted for rotation on a fixed axis disposed crosswise to said ends of said shafts, and hypoid pinions on said shafts meshing with the respective gears of said double hypoid gear.

14. A driving mechanism comprising transversely spaced drive and driven shafts, and a driving connection between said shafts at one end thereof, said connection comprising a double hypoid gear mounted for rotation on the fixed axis disposed crosswise to said ends of said shafts, hypoid pinions on said shaft meshing with the respective gears of said double hypoid gear, and means for supporting said shafts for relative rotary movement about the fixed axis about which said double hypoid gear rotates.

15. A driving mechanism for a motor boat comprising a motor mounted in the stern of said boat, a drive shaft extending forwardly from said motor, a rearwardly extending propeller shaft disposed at an angle to said drive shaft, said drive and driven shafts being disposed in different vertical planes, and a driving connection between adjacent forward ends of said shafts, said connection comprising two gears arranged to rotate together about a fixed axis disposed crosswise to said ends of said shafts, pinions on said shafts meshing with the respective gears, and means for supporting said shafts for relative rotary movement about the axes of said gears.

Signed at Detroit, Michigan, this 19th day of June, 1929.

LAURENCE R. BUCKENDALE.